United States Patent [19]
Saxe

[11] 4,055,894
[45] Nov. 1, 1977

[54] SABER AND RECIPROCATING SAW BLADE TURNING CONTROL ARRANGEMENT

[76] Inventor: Leo C. Saxe, 10907 Annapolis Road, Bowie, Md. 20716

[21] Appl. No.: 742,748

[22] Filed: Nov. 18, 1976

[51] Int. Cl.² .............................................. B27B 19/09
[52] U.S. Cl. ......................................... 30/394; 83/747
[58] Field of Search ................. 30/166, 392, 393, 394; 128/2 M; 83/747

[56] References Cited
U.S. PATENT DOCUMENTS

| | | | |
|---|---|---|---|
| 3,448,781 | 6/1969 | Angelucci | 30/392 |
| 3,494,390 | 2/1970 | Dudek | 30/394 |
| 3,494,391 | 2/1970 | Mango | 30/394 |
| 3,665,983 | 5/1972 | Wagner | 30/394 |
| 3,795,980 | 3/1974 | Batson | 30/394 |

*Primary Examiner*—Jimmy C. Peters

[57] ABSTRACT

To provide a directional guiding mechanism for saber type and blade control in tools, having a motor, a manipulating handle and a reciprocating shaft in a housing, to which shaft a saw blade, etc., is attached.

One concept of the invention is achieved by the use of a unique control mechanism including a rotatable flexible cable by which to rotate the reciprocating saw blade in the cut, in any desired direction, with less movement or turning of the main body of the tool especially in a restricted or cramped area. These operations can be accomplished with the use of but one hand of the operator, leaving the other hand free to hold firm the material to be cut or worked upon.

7 Claims, 6 Drawing Figures

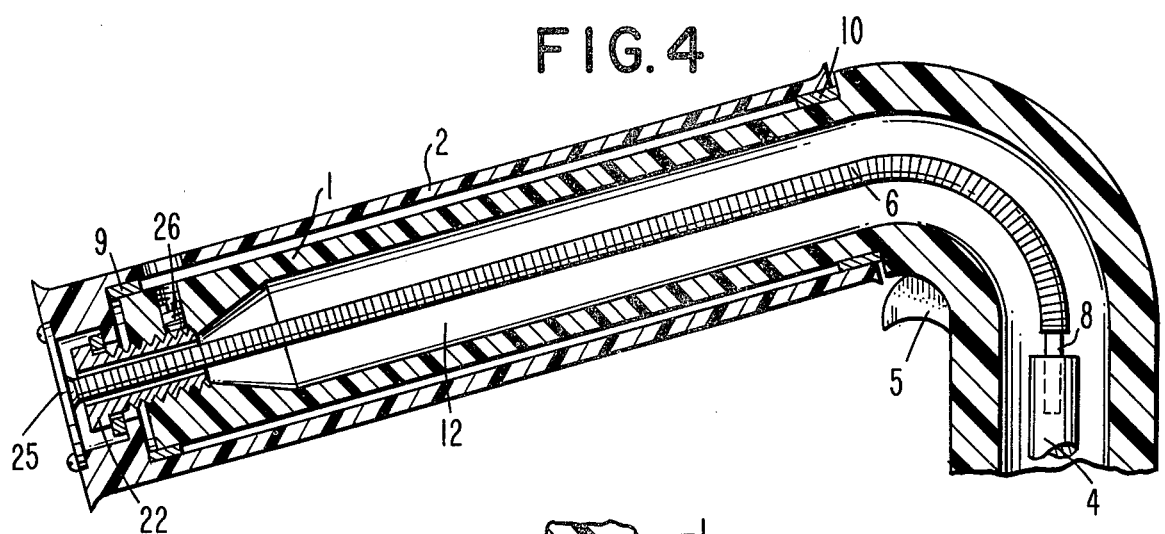
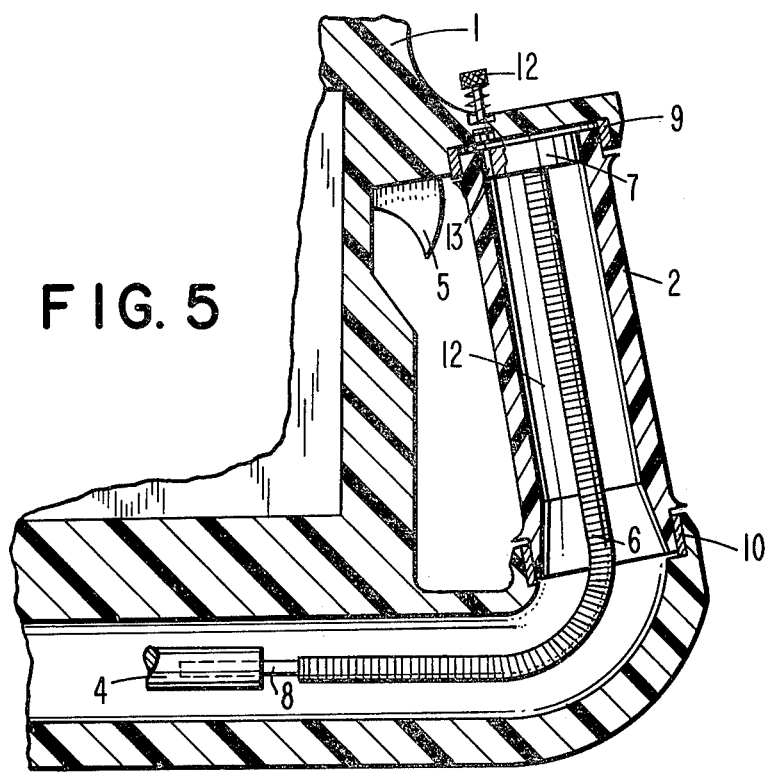
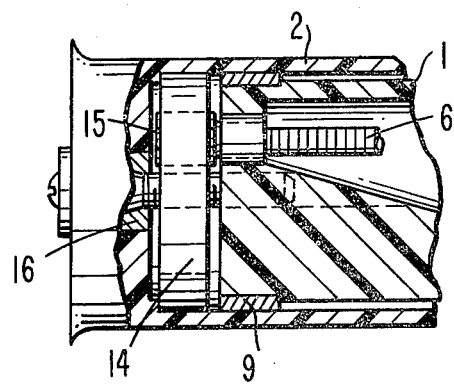

SABER AND RECIPROCATING SAW BLADE TURNING CONTROL ARRANGEMENT

Some of the objectives of this invention is the modification and improvement in the use and result of portable power tools having a reciprocating shaft to which a saw blade, etc., is attached.

These objectives are: to increase the ease of operation of the tool in its work, its versitility in application, the resultant increase in satisfaction, and also its simplicity of manufacture.

These attainments are accomplished by the use of a full-hand grip of the tool's rotatable manipulating handle to which one end of a rotatable flexible cable is anchored, the other end of the cable extending forward and is attached to one end of a rotatable reciprocating shaft on whose opposite end a saw blade, etc., is fastened. An open space is provided through the center of the manipulating handle permitting the reciprocating movement of the cable to flex over its entire length.

Upon rotation of the rotatable manipulating handle around its axis of rotation the attached flexible cable rotates the rotatable reciprocating shaft and attached saw blade around its axis of reciprocation.

Another concept of this invention is achieved by the use of gearing, which includes a ring gear located in the handle and a pinion gear in the housing, in conjunction with a rotatable flexible cable, thus with a slight rotation of the handle a greater ratio of rotation is imparted to the reciprocating shaft and blade and imparting a quick directional responce to the blade in the cut.

Another concept of the invention, is a provision for an opening through a transverse partition of the housing for the rotatable flexible cable to pass through, having an attached collar above and below the transverse partition of the housing, allowing the cable to rotate but preventing the rotatable flexible cable to reciprocate, so a splined sleeve arrangement is provided at the connection of the cable and reciprocating shaft's ends.

Another concept of the invention is the exclusion of a rear rotatable manipulating handle support, necessitating a portion of the tool's main housing, extending back and through the center of the rotatable manipulating handle with bearing surfaces to permit the rotation of the manipulating handle thereon.

These concepts of the invention with other apparent advantages reside in the details of the construction and operation and are hereinafter more fully described and claimed.

The accompanied drawings forming a part thereof and used as a reference.

BRIEF DESCRIPTION OF THE DRAWING

FIG. 4 is a cutaway side view of a third concept of the control arrangement of the invention.

FIG. 5 is a perpendicular cutaway side view of a fourth arrangement as conceived as part of the invention.

FIG. 6 is a fragmentary cutaway sectional side view of a gear drive arrangement which may be incorporated into FIG. 4 or FIG. 5.

Referring now to the drawings wherein like reference numbers indicate like parts throughout the several figures of the drawings.

In FIG. 1 is shown the main manipulating handle 2 of a portable power tool having a rotatable reciprocating shaft 4 in a housing 1 to which on one end of said shaft a saw blade, file, etc., can be attached.

As shown in each of the FIGS. 1, 2, 4 and 5 the handle 2 is rotatable and by various means rotates the rotatable reciprocating shaft of the tool.

Figure 1:
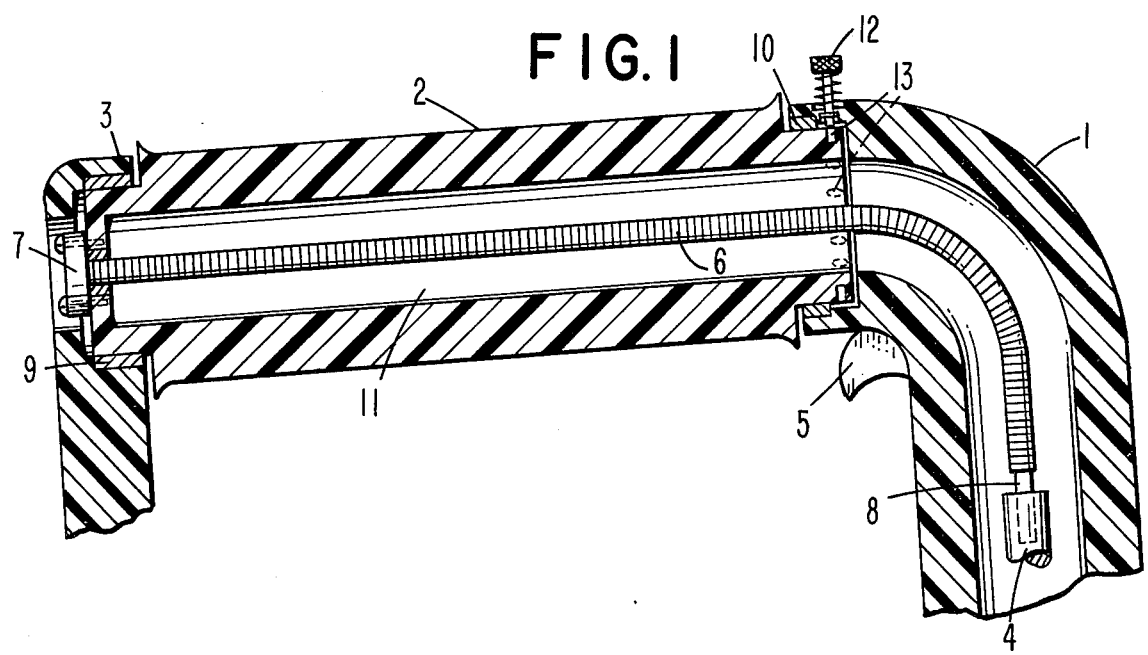
FIG. 1 is a horizontal cutaway side view of one concept of the invention.

In FIG. 1 the rear end handle 2 rotates on a bushing 9 which is anchored in part 3 from the motor housing. The front end of a rotatable handle 2 rotates on a bushing 10 which is anchored to the tool's main housing 1. A rotatable flexible cable 6 is anchored to a plate 7 attached to handle 2 and extends forward through the opening 11 in the center of the handle 2 attaching to the rotatable reciprocating shaft 4 of the tool. As can be seen when the rotatable manipulating handle 2 is rotated the reciprocating shaft 4 is also rotated by the attached rotatable flexible cable 6.

A handle locking spring loaded device 12 is anchored near the front end of the handle 2 into the main tool housing 1 to engage into openings 13 in the handle 2 to prevent the rotatable handle 2 and the reciprocating shaft 4 from turning.

Figure 2:
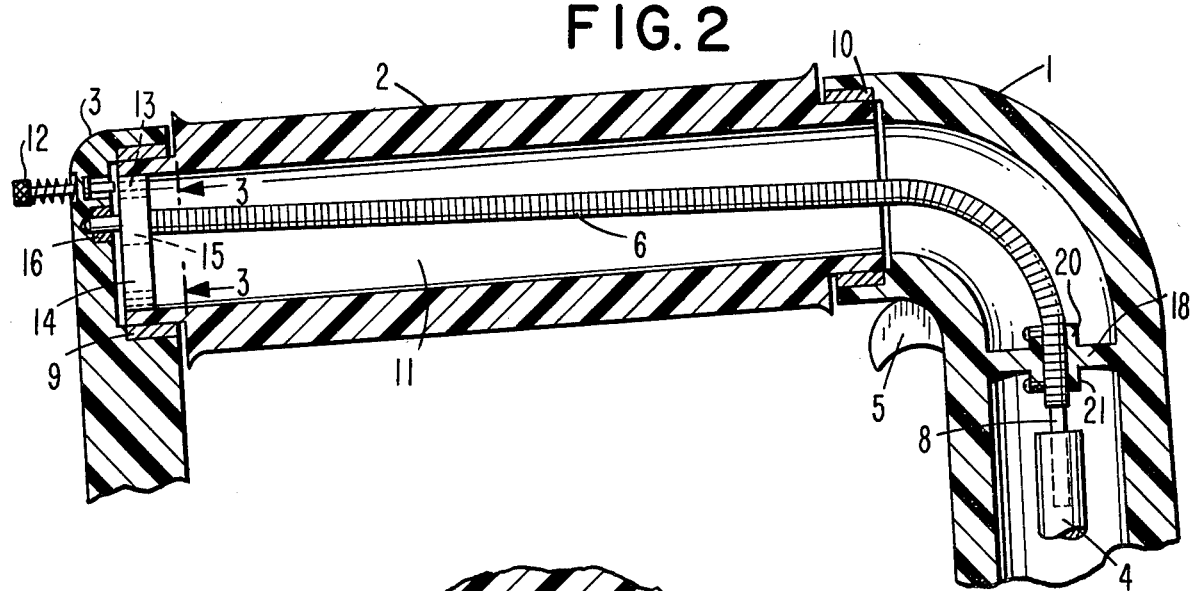
FIG. 2 is a side view of a second design of the invention.
Figure 3:
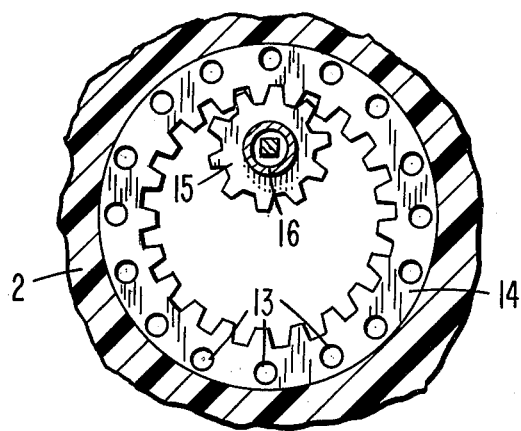
FIG. 3 is a fragmentary sectional end view showing the gearing arrangement, incorporated into the rotatable handle as in FIG. 2.

FIG. 2 a bushing 16 is secured in and to the rear motor housing 3 on which is mounted a rotatable pinion gear 15, that meshes into a ring gear 14 mounted to the rotatable manipulating handle 2, as shown in FIG. 3 of the handle gearing arrangement. To the pinion gear 15 is attached one end of a flexible cable 6 the other end of the cable 8 extends through a transverse partition 18 of the main housing 1. Collars 20 nd 21 are attached to the flexible cable 6 above and below the transverse partition of the housing 18 to prevent the longitudenal movement of the cable 6 but would allow a rotational movment. The cable 6 whose end 8 is splined, connects to one end of the splined rotatable reciprocating shaft 4, thus permitting a longitudenal movement of the reciprocting shaft 4.

By this arrangement a slight rotation of the manipulating handle 2 being connected to gears 14 and 15 which in turn is connected to a rotatable flexible cable 6 the other end 8 being attached to the rotatable reciprocating shaft 4 will have a ratio of approximately 1:2 to 3.

A handle locking device 12 is anchored in the housing 1 at the front end of the handle 2 engaging in holes 13 as in FIG. 1 to prevent the handle and reciprocating shaft from rotating.

FIG. 4 another concept of the invention is the exclusion of a rotatable manipulating handle support 3 making it necessary for an extension of the tool's main housing toward the rear of the main housing 1 in the form of an inner stationary manipulating handle 1 on which are anchored bushing 9 on the back end and bushing 10 at the front over which a full-hand grip rotatable manipulating handle 2 is mounted. The rotatable manipulating handle is fastened at the rear to the inner housing 1 by means such as a hex headed hollow bolt 22 and is seated in the back end of the inner housing 1. A plate 25 is attached to the rear end of the rotatable manipulating handle, a rotatable flexible cable 6 is attached to plate 25 passing through hollow bolt 22 attaching by means to one end of the rotatable reciprocating shaft 4 a handle locking means such as 12 in FIG. 1 is provided.

FIG. 5 is another concept of the invention. As in FIG. 1 the rotatable manipulating handle 2 rotates on bushings 9 and 10 anchored in the housing 1 to the manipulating handle is mounted to a plate at either end of the handle 2 to which a rotatable flexible cable 6 is attached, the other end of the cable 6 being connected to the rotatable reciprocating shaft 4. A handle locking device is anchored in housing 1 and engages into the plate 7.

FIG. 6 is a fragmentary cutaway sectional side view of a gear drive arrangement similar to that illustrated in FIG. 3 but which is specifically adapted to be incorporated into the embodiment of the device shown in FIGS. 4 or 5.

I claim:

1. In portable power tools of the type having a reciprocating shaft mounted within a housing to which a saw blade etc., is attached, means to rotate the said reciprocating shaft about its axis of reciprocation by means of a full-hand grip rotatable manipulating handle for the tool and rotatable flexible cable means connected between said shaft and said handle for rotating said shaft.

2. The structure as defined in claim 1 in which the rotatable flexible cable is supported by means to a transverse partition in the housing.

3. The structure as defined in claim 1 wherein said reciprocating shaft is rotated about its axis or reciprocation by means of said rotatable manipulating handle and rotatable flexible cable in conjunction by means of gearing, comprising a ring and pinion gear.

4. The structure as defined in claim 1 and means by which the full-hand grip rotatable manipulating handle is anchored to the tool's housing, means to connect the flexible cable to rotatable handle means to connect flexible cable's end to the rotatable reciprocating shaft.

5. The structure as defined in claim 3 and means to attach the ring gear to the rotatable handle's housing, means to mount the pinion gear to the tool's housing, means to connect pinion gear to rotatable flexible cable.

6. The structure as defined in claim 1 and locking means to prevent the rotatable manipulating handle from rotation.

7. The structure as defined in claim 2 and locking means to prevent the rotatable manipulating handle from rotation.

* * * * *